(12) United States Patent
Lander et al.

(10) Patent No.: US 6,567,006 B1
(45) Date of Patent: May 20, 2003

(54) MONITORING VIBRATIONS IN A PIPELINE NETWORK

(75) Inventors: Paul Lander, Maynard, MA (US); William E. Saltzstein, Woodinville, WA (US)

(73) Assignee: Flow Metrix, Inc., Maynard, MA (US)

( * ) Notice: Subject to any disclaimer, the term of this patent is extended or adjusted under 35 U.S.C. 154(b) by 0 days.

(21) Appl. No.: 09/443,356

(22) Filed: Nov. 19, 1999

(51) Int. Cl.[7] .............................................. G08B 21/00
(52) U.S. Cl. ......................... 340/605; 340/683; 73/40; 73/40.5 A; 73/152.58; 73/592; 702/51; 702/54
(58) Field of Search ................................. 340/605, 689, 340/683, 681, 603, 606, 539; 73/40.5 A, 592, 587, 542, 40.5 R, 40, 152.58; 702/56, 54, 51

(56) References Cited

U.S. PATENT DOCUMENTS

| | | |
|---|---|---|
| 4,083,229 A | 4/1978 | Anway |
| 4,237,454 A * | 12/1980 | Meyer ........................ 340/682 |
| 4,289,109 A | 9/1981 | Claytor |
| 4,306,446 A | 12/1981 | Fukuda |
| 4,327,576 A | 5/1982 | Dickey et al. |
| 4,543,817 A | 10/1985 | Sugiyama |
| 4,609,994 A | 9/1986 | Bassim et al. |
| 4,779,458 A | 10/1988 | Mawardi |
| 4,858,462 A | 8/1989 | Coulter et al. |
| 4,958,296 A | 9/1990 | Saitoh et al. |
| 5,038,614 A | 8/1991 | Bseisu et al. |
| 5,117,676 A | 6/1992 | Chang |
| 5,205,173 A | 4/1993 | Allen |
| 5,272,646 A | 12/1993 | Farmer |
| 5,361,636 A | 11/1994 | Farstad et al. |
| 5,416,724 A | 5/1995 | Savic |
| 5,531,099 A | 7/1996 | Russo |
| 5,541,575 A * | 7/1996 | Virnich ........................ 340/506 |
| 5,544,074 A | 8/1996 | Suzuki et al. |
| 5,854,994 A * | 12/1998 | Canada et al. ................. 702/56 |
| 5,974,862 A * | 11/1999 | Lander et al. ................ 73/40.5 |
| 6,082,193 A * | 7/2000 | Paulson .................... 73/152.58 |

OTHER PUBLICATIONS

H. Schwarze; "Computer supported measuring system for automatic control of pipe networks and leak detection"; *Technisches Messen* 55(7–8); pp. 279–285; 1988 (Partial Translation included in text).
Supplementary European Search Report dated Mar. 2, 2001.

* cited by examiner

*Primary Examiner*—Nina Tong
(74) *Attorney, Agent, or Firm*—Fish & Richardson P.C.

(57) ABSTRACT

The invention relates to acoustic detection of leaks in a pipeline using locally-intelligent, data-adaptive monitors deployed for a period of time. Monitors are initialized by a base station. Following deployment, monitors receive vibration signals at programmed times, process the vibration signals to detect and characterize abnormal vibrations, and save the processed data in the monitor. Monitors may communicate digitally with a base station, sending processed data and receiving instructions. Alternatively, monitors may be removed from the pipeline and placed in a docking station prior to initialization and subsequent re-deployment on a pipeline. A procedural step of re-synchronization corrects for any mis-alignments in time that may occur among received vibration signals from different monitors. Received vibration signals from two or more monitors may then be analyzed using a correlative method to localize the position of any leaks present in the pipeline.

18 Claims, 11 Drawing Sheets

Command Table

| Description | ID Code |
|---|---|
| Receive New Program | 0x01 |
| Send Data | 0x02 |
| Synch | 0x03 |
| De-Synch | 0x04 |
| Test | 0x05 |

FIG. 7

MONITORING VIBRATIONS IN A PIPELINE NETWORK

FIELD OF INVENTION

The invention relates to vibration monitoring and acoustic leak detection in a pipeline network.

BACKGROUND

Leaks in pipelines create vibrations that can be sensed at significant distances from the leak site. These vibrations are propagated in both directions away from the leak at a constant velocity. Sensors positioned at different locations on the pipeline will sense the vibrations at different times. The time at which each sensor senses the vibration is proportional to the distance from the sensor to the leak. Leak noise correlation is a well-known technique for measuring this time delay. For example, Lander, U.S. Pat. No. 5,974,862, which is incorporated by reference, describes a technique for pinpointing a leak using digital cross-correlation. In Lander's system, the location of the leak is determined using remote sensing units having processors in digital radio communication with a computer base station.

Other systems for longer-term monitoring of vibration signals have been proposed. For example, Bassim, U.S. Pat. No. 4,609,994, discloses a method of long-term monitoring of pipelines. Detector-analyzer units including analog circuits are deployed at intervals along a pipeline and connected to a control unit. When an analog circuit detects large vibrations originating from a pipeline failure, the corresponding detector-analyzer unit issues an alarm to the control unit.

In another approach, Virnich, U.S. Pat. No. 5,541,575, describes a leakage monitoring system having a series of integrated monitoring units digitally connected to an evaluation unit. The system functions by comparing resistive measurements from leakage sensors to baseline values recorded at a time when it was known that no leakage was present.

SUMMARY

In one general aspect, the invention features techniques for monitoring vibrations and detecting leaks in a pipeline network by receiving vibration signals from sensors placed on a pipeline. In particular, two or more monitors, each of which includes at least a digital communication device, a timer, a processor, and a sensor, process vibration signals recorded at programmed times.

Embodiments may include one or more of the following features. For example, the timers within each monitoring unit may be time-synchronized prior to deployment. The programmed recording times may be at night when pipeline pressure and leak sounds are high and flow and environmental noise are minimal. Received vibration signals are processed individually in each monitor to model, characterize, and trend pipe vibration patterns. Vibration signals may be received regularly or intermittently over periods of hours, days, months or years. Variations in the received signals can identify leak sounds having magnitudes far below the threshold of human hearing. Processed signals may be sent to a base station, either regularly or on demand, in a flexible manner. The timers in two or more monitors may be re-synchronized using a docking station to enable time-alignment of the received signals in any number of monitors. Time-aligned received signals may be analyzed using a correlative method, which enables the detection and localization of the source of coherent sounds, such as those created by leaks in the pipeline network.

The invention offers a number of advantages. For example, distribution of monitors throughout a pipeline network allows previously unavailable information about the network to be assessed at a central or otherwise convenient location. Each monitor contains a locally-intelligent processor, which obviates the need for continuous manual surveying of the pipeline distribution system. Current and historical processed vibration signals, optimally recorded at night, can be analyzed using graphical displays of pipe sounds, listening, correlation, and other signal processing methods.

The monitors used by the invention are light-weight, low-power, cost-effective devices which may be safely applied to the pipeline network without intervention for extended periods of time. The monitors offer a high degree of protection from shocks, weather, leaking water, and vandalism. The system is virtually maintenance-free. Monitors can communicate individually or collectively by short or long range digital radio, telephone, or direct connection to a base station.

The techniques can be used to perform short or long-term serial analysis of pipeline vibrations. Monitors can detect existing leaks, newly emerging leaks, and sudden breaks or ruptures of the pipeline. Areas of particular susceptibility to pipe failure may be monitored indefinitely, preempting potentially serious problems. The techniques also can be used to perform routine surveying of the pipeline network using short-term analysis of vibrations in a particular area of the network. After detection and localization of any leaks present, the monitoring units may be initialized and deployed in a different area of the network. Mobility and short-term analysis capabilities increase the cost-effectiveness and usefulness of the invention, particularly in more sparsely populated areas.

The techniques can reliably detect leaks significantly below the threshold of human hearing due to the sensitivity to vibrations achieved by the invention's design and signal processing capabilities.

The techniques also can account for changes in flow and pressure profiles in gas and water distribution systems due to modifications, new construction, and changes in consumption patterns. These physical changes in pipelines lead to changes in vibration characteristics. The techniques adapt to these changing system conditions in two ways. First, because each monitor's processing is data-adaptive, individual monitors automatically adapt to locally-changing conditions. Second, the techniques can adapt to known changes in the distribution system by reprogramming the monitors from a base station using a digital communication device.

The techniques' data-adaptive, serial analysis of vibrations is effective with all Newtonian fluids, all pipe types, and a wide range of distribution system pressures. This effectiveness is achieved because each vibration monitor acts as its own reference to analyze contemporary vibration signals with respect to trends computed from historical processed data.

The monitors can transmit alarms at different, preprogrammed levels of urgency. This means that network maintenance personnel can be alerted to the presence of leaks on high pressure gas mains or very large water mains immediately. Problems with smaller water mains and service lines can be monitored and reported at regular intervals, and scheduled for repair as appropriate. p The techniques combine the flexibility of both short and long-term monitoring. Monitors can be deployed for hours, days, months or years and can be programmed both to record at any time, and to communicate with a base station. They are thus able to pinpoint leaks by recording vibration data at the most advantageous times, such as at night.

The techniques can adapt to the pipeline conditions by unique adaptive processing of serially recorded vibration signals. This permits detection of pre-existing leaks and of emerging leaks that develop either gradually or suddenly.

The techniques are able to detect very small abnormal vibration signals, inaudible to human hearing, which are significantly below the threshold of existing detection methods. Such abnormal small vibration signals are very important to detect. They often represent the most difficult to find leaks. These leaks are typically long-lived and are the most hazardous and the most expensive in terms of lost product from the pipe. Abnormal small vibration signals may also be the harbinger of a catastrophic pipe failure. Their successful detection is the key to preventing catastrophic pipe failures before they occur.

The techniques allow deployment for any period of time. They also promise to permit pinpointing of previously undetectable leaks, and to facilitate flexible communication with a base station.

The systems employed by the techniques are almost maintenance-free and may be produced at low cost. Modes of digital communication are flexible and readily available worldwide. The network of monitors is suitable for utilities with pipeline distribution systems of almost any size and configuration. Any number of monitors can be deployed, either temporarily or permanently, to meet the needs of small rural utilities through to major cities.

Other features and advantages will be apparent from the following description, including the drawings, and from the claims.

BRIEF DESCRIPTION OF THE DRAWING FIGURES

FIG. 7 is a diagram of examples of commands transmitted from the base station to the monitor.

DETAILED DESCRIPTION

Overview

Figure 1:
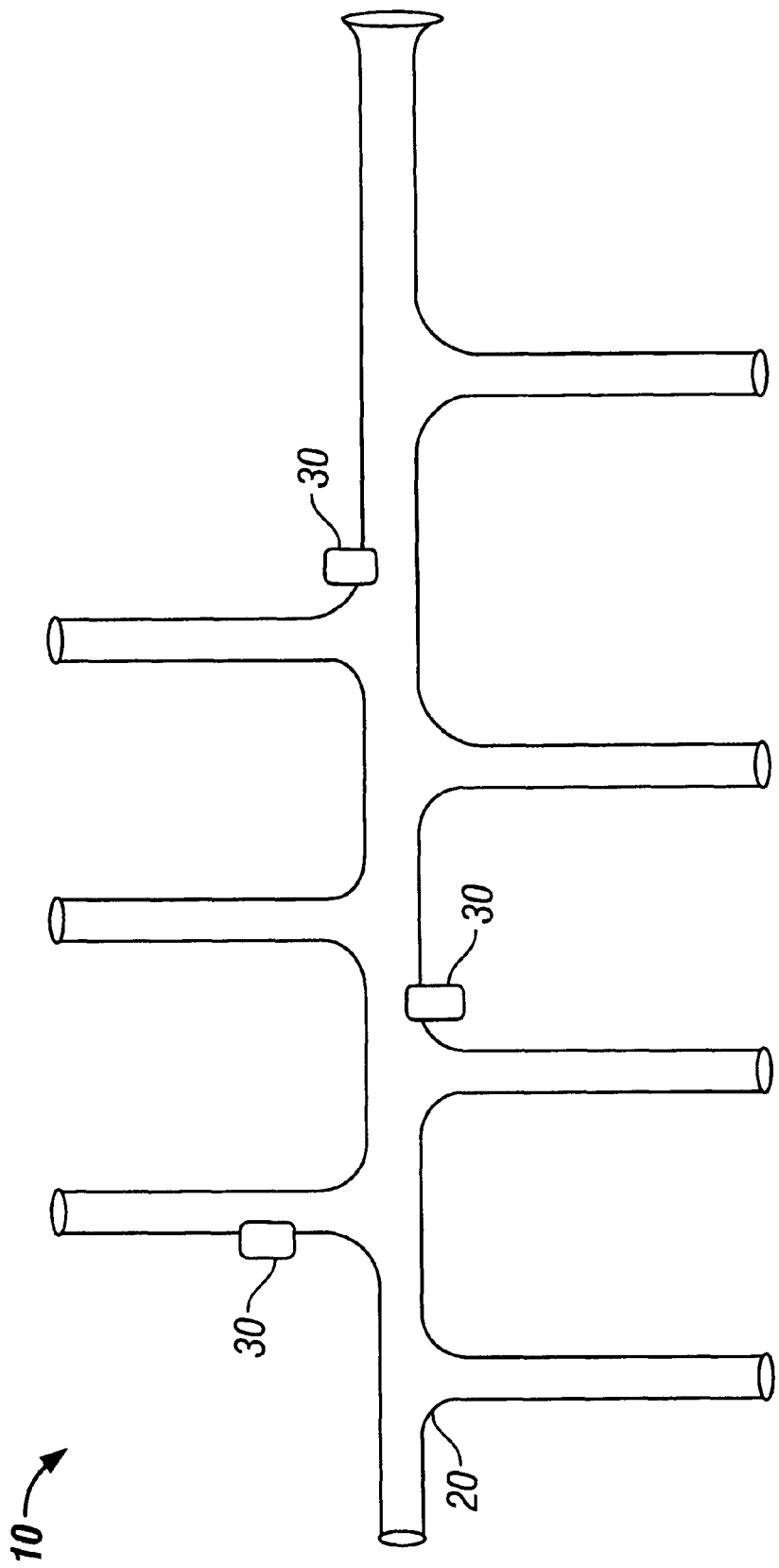
FIG. 1 is a block diagram of the major components of a leak detection system.

Referring to FIG. 1, a vibration monitoring and leak detection system 10 that may be used to detect the presence and approximate location of leaks from a pipeline network 20 includes two or more monitors 30.

Monitor Physical and Electrical Characteristics

Figure 2:
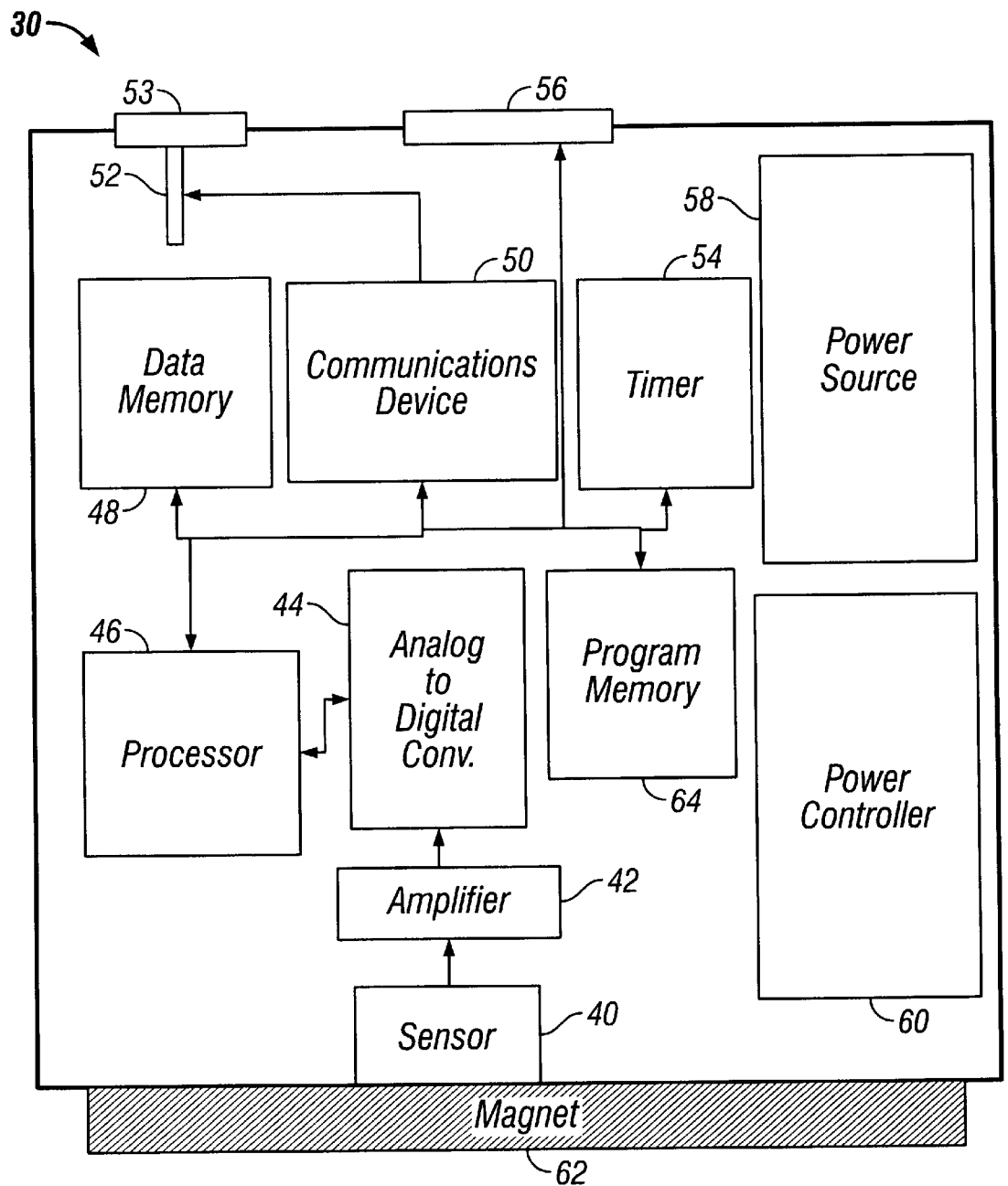
FIG. 2 is a block diagram of hardware components of a monitor of the system of FIG. 1.

Referring to FIG. 2, each monitor 30 includes an internal vibration sensor 40, which converts a vibration signal into a proportionate electrical voltage. The electrical signal is then amplified with an electronic gain and electronically filtered by an electronic amplifier 42. The amplified and filtered signal is then provided to an analog-to-digital converter (ADC) 44, which converts the electrical signal into a digital vibration signal. The ADC is controlled by a processor 46, which processes the digital vibration signal. The processed data can be stored in a data memory unit 48.

A digital communications device 50 is also connected to the processor 46. The communications device 50 may be any device that provides a digital communications link, such as, for example, a telephone, a modem, a pager, a radio, or a data port. If the communications device transmits digital signals by radio, it is connected to an antenna 52. The monitor 30 may include a panel 53, constructed in its enclosure, which will pass electromagnetic waves to enable radio transmission.

A timer 54 is connected to the processor 46 to facilitate performance of processing tasks at programmed times.

A digital signal connector 56 is connected to the processor to facilitate direct connection with a docking station, base station, or other device.

The monitor also includes a power source 58, such as a battery or solar cell. The distribution of power is controlled by a power controller 60.

The monitor also includes structure for attaching the monitor to a pipeline, such as a magnet 62.

The monitor derives its software program from a program memory 64.

Docking Station

Figure 3:
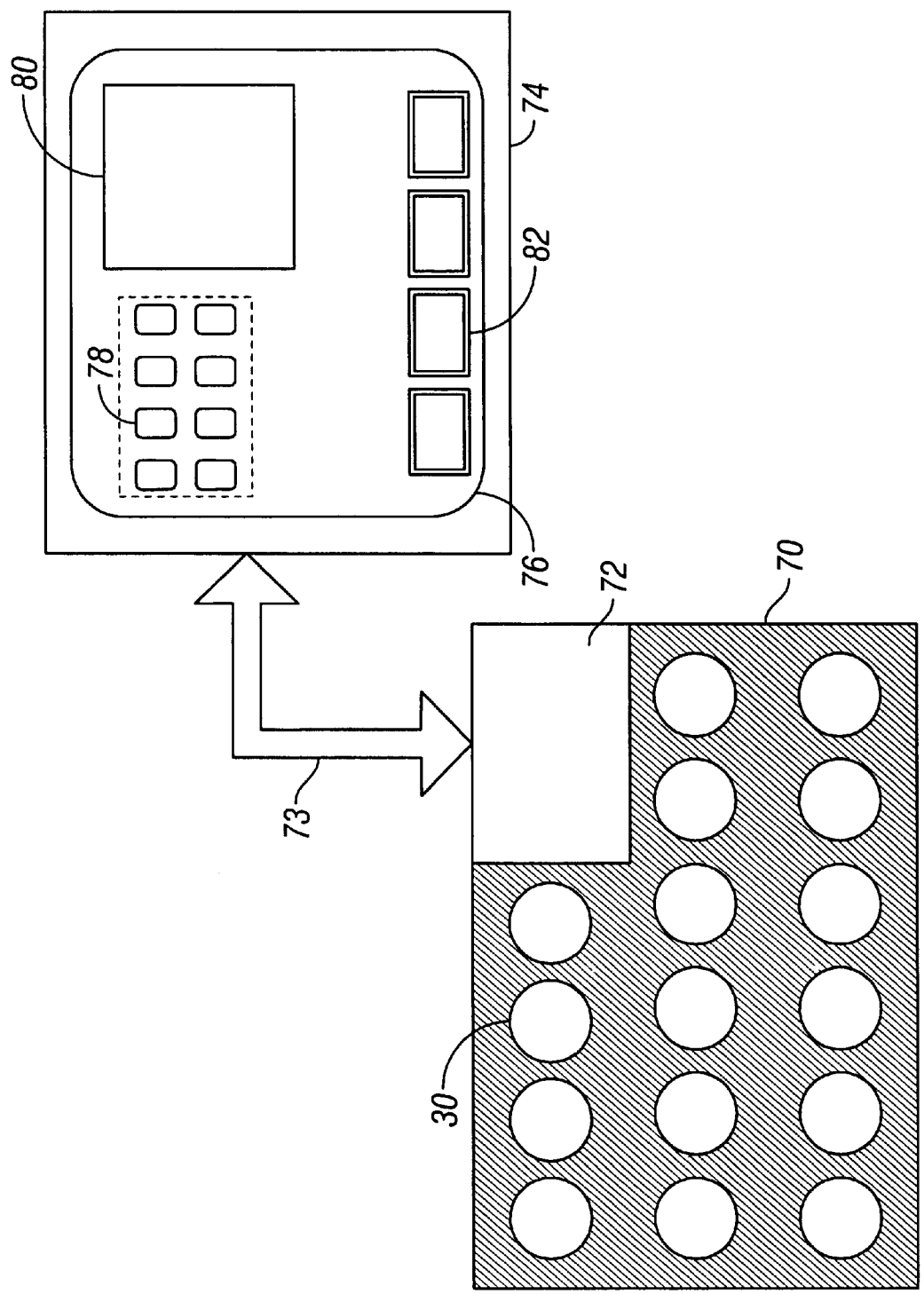
FIG. 3 is a block diagram of a docking station connected to a base station.

Referring to FIG. 3, a set of monitors is initially housed in a docking station 70. Electronic circuits 72 in the docking station facilitate a communication link 73 between the monitors 30 and a base station 74, which may be, for example, a portable personal computer. The base station has a display 76, which may include graphical representations 78 of the monitors, a map 80 showing the area of deployment, and user interface controls 82.

Figure 4:
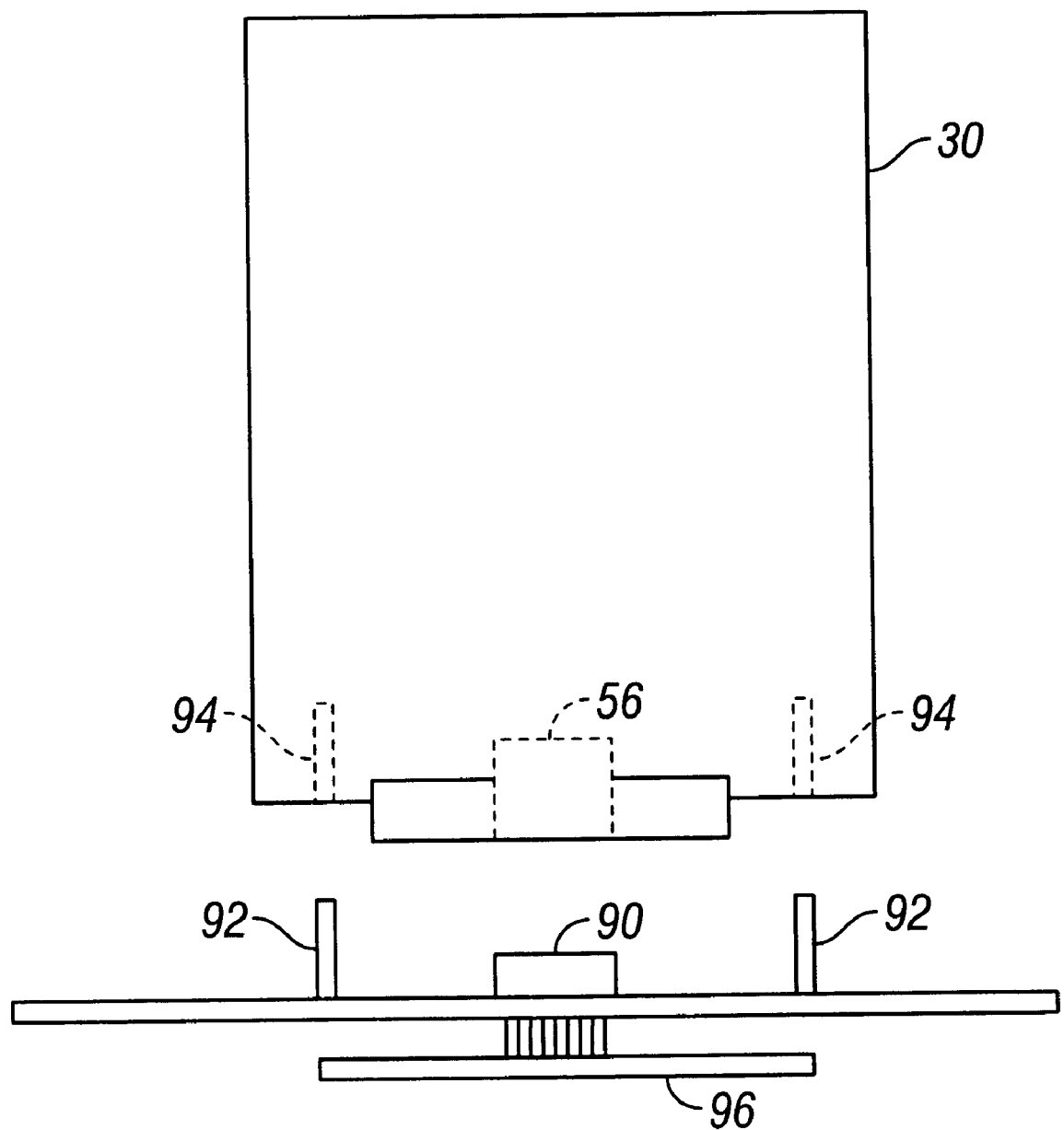
FIG. 4 is a block diagram of hardware connection of each monitor in a docking station.

Referring to FIG. 4, each monitor 30 is mechanically secured in the docking station 70 by the monitor's digital signal connector 56 and a panel plug 90 in the docking station. The monitor is oriented relative to the docking station by a mechanical key formed by two asymmetric posts 92 in the docking station and two countersunk holes 94 in the monitor's enclosure. The panel plug is electrically connected to the electronic circuits 72 in the docking station via a printed circuit board 96.

Monitor Initialization

Monitors may be initialized individually or collectively. In one implementation, initialization is achieved by communication with a base station. In particular, a monitor is initialized by a direct digital connection between the monitor and the base station, optionally using a docking station to communicate with more than one monitor at a time. As an alternative, a monitor may be initialized by a radio or telephonic message from a remote base station. A particular message may be sent to one or more monitors. The base station, which may be portable, also may send a short-range radio message or other electromagnetic signal to one or more monitors. The monitors may be, but do not need to be, deployed on the pipeline network at the time the message is sent.

Initialization is the process of preparing one or more monitors for deployment. Initialization may include synchronizing the timers of two or more monitors to; enable later time-alignment of their received vibration data. A synchronization signal may be sent simultaneously to a number of monitors housed in a docking station. As an alternative, a synchronization signal may be sent at different times to different monitors. In this latter case, the synchronization signal includes an accurate time, which may be provided by the docking station, the base station, or a separate timer.

Initialization may also include programming monitors with a specific protocol for recording vibration signals. This protocol may include instructions to record at specific times, such as once per day, beginning at three am. Monitors may thus take advantage of quiet nighttime conditions when environmental and flow noise are low, while pipeline pressure—and hence vibrations due to pipeline leaks—are high. The protocol may also include instructions for a monitor to adjust its recording schedule based on that monitor's analysis of either one or a series of prior recordings. For example, when an abnormal pipeline condition is detected, it may be useful for a monitor to make one or more recordings shortly afterwards to eliminate the possibility of artifacts in any particular recording. Initialization also may include resetting or modifying the history of processed data that has been derived by a monitor from previous recordings.

Monitor Deployment

Figure 5:
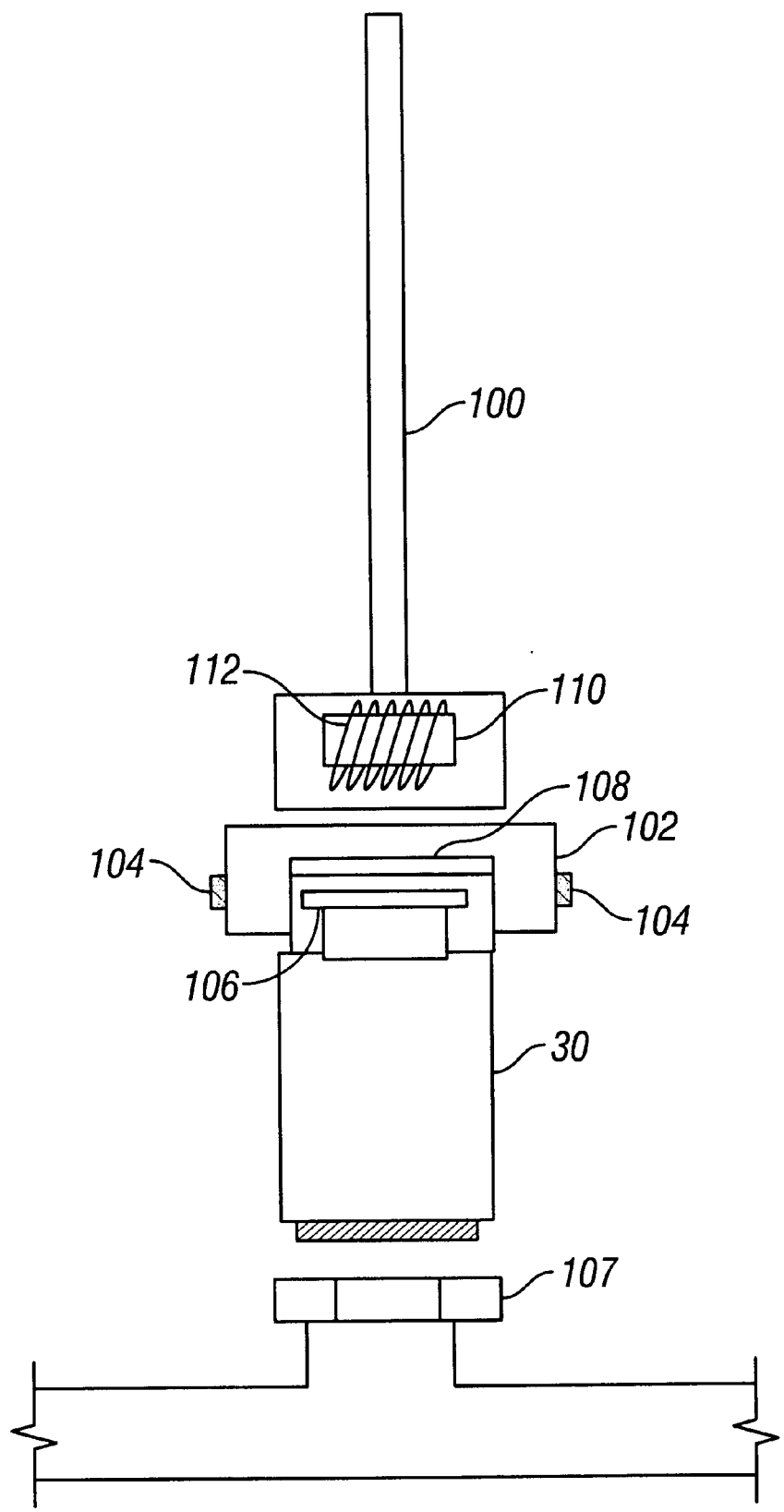
FIG. 5 is a block diagram showing deployment of a monitor using an electromagnetic deployment tool.

Referring to FIG. 5, the monitor 30 may be deployed by an electromagnetic tool 100. In one implementation, a ferrous metal cover 102 is fitted firmly over the monitor by means of thumb screws 104. When the thumb screws are tightened over a flange 106, the cover 102 protects the monitor's electrical connector 56 from ingress of water or dirt by means of an 'O'-ring seal 108. The electromagnetic tool consists in a core 110 which may be magnetized by switching on a current flow in a wire 112 wound around the core. When activated, the electromagnetic tool holds the monitor by the force of magnetic attraction present between the electromagnetic tool 100 and the cover 102. The monitor may now be maneuvered into place in a dark, enclosed space, such as a typical valve chamber in a pipeline network. The monitor is often placed directly on a valve top 107 which is connected directly to the pipe 20. When the current flow is switched off, the electromagnetic tool releases its hold on the cover 102, allowing placement of the monitor at a useful pipeline sensing point, such as a valve top.

Monitor Operation

Figure 6:
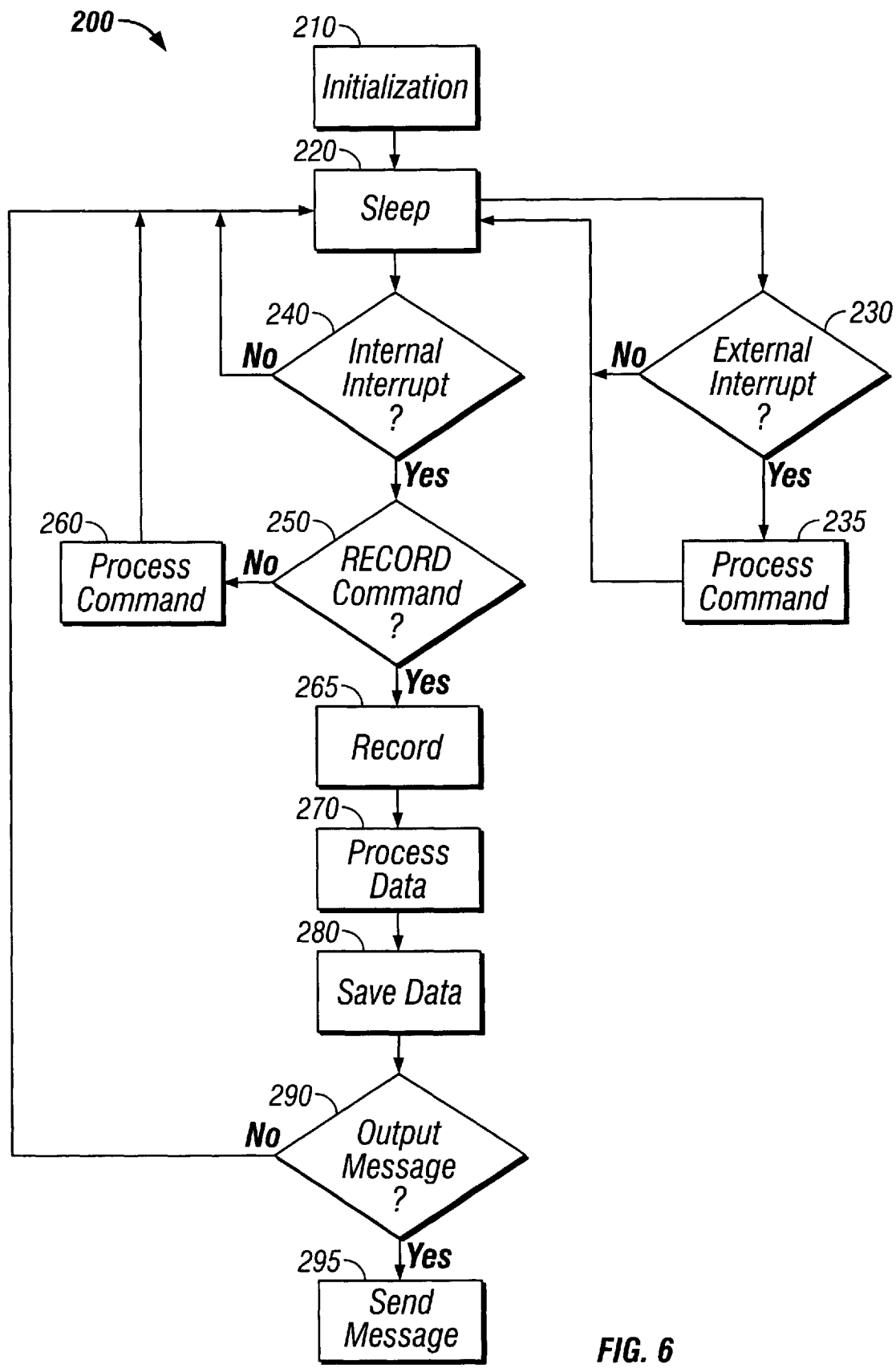
FIG. 6 is a flowchart of the software operation of a monitor.

Referring to FIG. 6, a monitor operates according to a procedure 200. An initialization procedure 210 is first performed, as described above. The monitor then enters its default mode, which is a sleep mode 220. In this mode, the monitor conserves power by shutting down all but essential hardware and software processes. In sleep mode, the monitor may respond to an external interrupt 230 that causes the monitor to wake up from sleep mode. The monitor returns to sleep mode after the external interrupt is processed 235.

Referring to FIG. 7, a number of commands may be processed in response to the external interrupt. These commands include commands generated externally from the monitor, such as commands sent directly by a base station, or commands received via a docking station. External commands may be sent either through the electrical connector or the communications unit. An advantage of the invention is the flexibility in which commands can be handled by the locally-intelligent monitor and the diversity of commands which may be sent. Examples of command functions include: modification of the recording protocol, requests to send received vibration data or processed data, synchronization of the timer, performance of a monitor test routine, receiving items in a dictionary of programmed abnormal pipeline states, and receiving an entirely new monitor control program. In general, the scope of usable commands is limited only by the hardware architecture of the monitor. New command capabilities may be added at any time by reprogramming the monitor with a received new program.

Referring again to FIG. 6, the monitor may also respond to an internal interrupt 240 which will cause the monitor to wake up from sleep mode. Upon an internal interrupt, the command that the processor will execute is determined by the processor's program. In one implementation, the processor first determines whether the command is to record vibration signals 250. If the command is not the record command, the internal interrupt will be processed 260 and the monitor will return to sleep 220.

If the command is the record command, the processor will cause the monitor to activate its recording hardware and to record vibration data 265 using programmed settings. Examples of settings include: setting the electronic gain and the electronic filter settings, the duration of the recording, and the number of samples per second acquired by the ADC. The recorded data is processed 270, either directly or after being retrieved from data memory 48. After processing the received vibration data, the processed data may be saved 280 in data memory. The processor then determines, using its program, whether a message should be sent 290 to a base station. A message may be required, for example, if a leak on the pipeline is determined to be present, if a previously detected leak appears to have deteriorated significantly, or if the present processed vibration data matches an item in the dictionary of programmed pipeline states that merits a message to the base station. If required, the message is then sent 295 and the processor causes the monitor to return to sleep mode 220.

Data Processing

Figure 8:
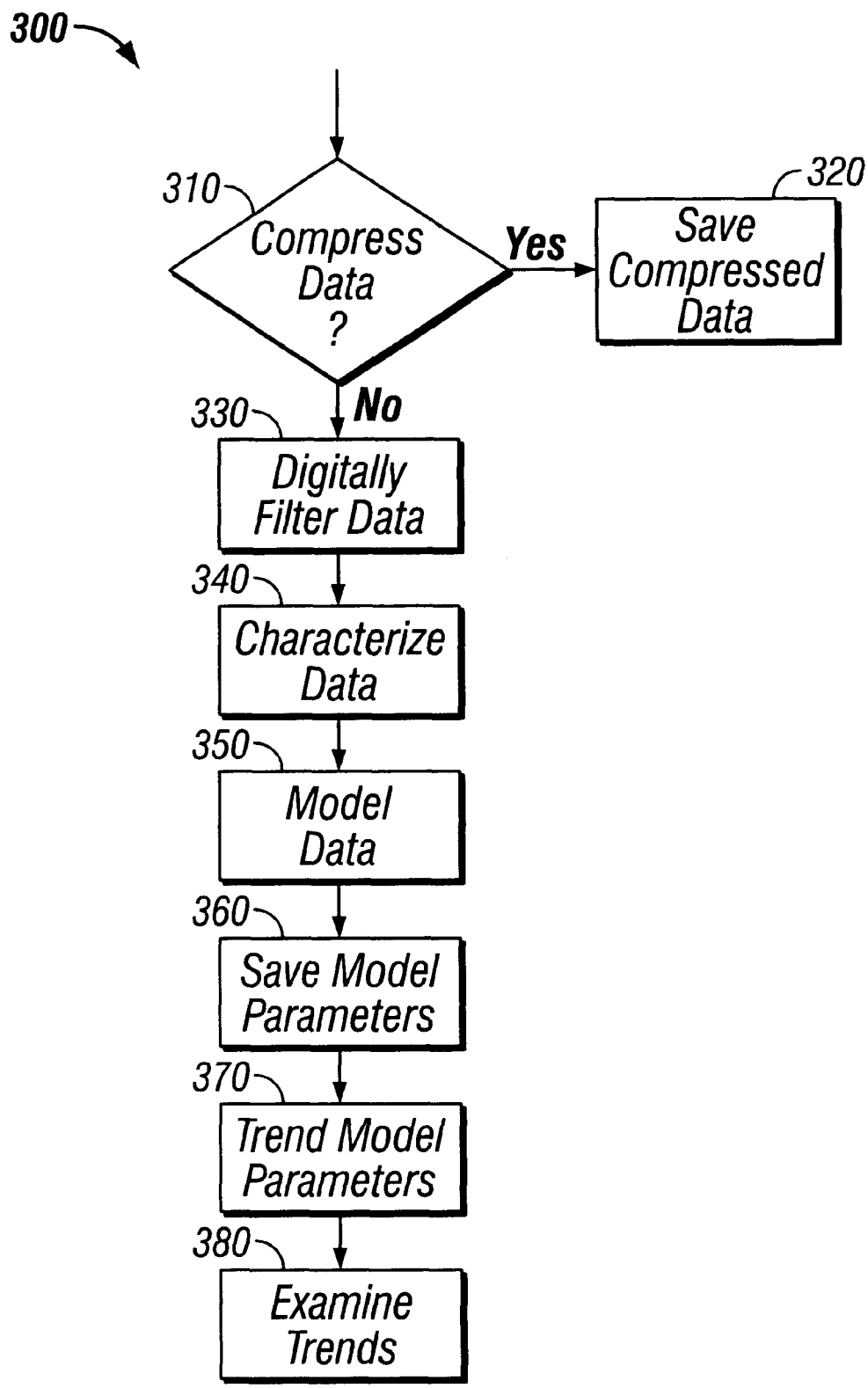
FIG. 8 is a flowchart of the software operation of a monitor for processing received vibration data.

Referring to FIG. 8, the data processing 270 of an individual monitor is performed according to a procedure 300. In one mode of operation, incoming data is optionally compressed 301 and then saved 320 into data memory 48. This processing option permits received vibration data to be retained for future transmission to the base station and subsequent decompression and restoration to its approximate original form.

Another processing path begins with digital filtering 330 of the received vibration data. This filtering step permits a particular signal bandwidth to be processed. Many factors determine the appropriate bandwidth to be processed at each site. Examples include the type of pipe and the fluid in the pipe (for example, water, steam, gas, jet fuel, petroleum). The exact filter to be used can be determined by the locally-intelligent processor or modified by a user, via a command sent from the base station.

In one implementation, a step of data characterization 340 is then performed to obtain a representative vibration signal. One technique for data characterization is to compute a representative power spectrum of the received signal. The ensemble-averaged power spectrum of the received data sequence, $\overline{P}_x(f)$, is defined using the expected value theorem as $$E[\overline{P_x}(f)] = E\left[\sum_{i=1}^{R} P_i(f)/R\right]$$

$$= E\left[\sum_{i=1}^{R} \left|\int x_i(t)w(t-\tau)e^{-j2\pi ft}dt\right|^2 / R\right]$$

$$= E\left[\sum_{i=1}^{R} \left|\int (s(t)+n_i(t))w(t-\tau)e^{-j2\pi ft}dt\right|^2 / R\right]$$

$$= S(f) + \overline{N}(f)$$

where $P_i(f)$ is the power spectrum of a time segment, i, of the received data, x(t), and the received data is divided into R segments. $P_i(f)$ is found by computing the Fourier transform of $x_i(t)$ and the term w(t) represents the analyzing window, typically a Hanning or rectangular window. From expected value theorem it follows that the averaged spectrum, $\overline{P}_x(f)$ ideally has two components, the power spectral densities of a consistent leak signal, S(f), and background noise, N(f), respectively. These results have been fully developed previously, in Reference Strackee (Strackee J and Cerri S A: Some statistical aspects of digital Wiener filtering and detection of prescribed frequency components in time averaging of biological studies. *Biol. Cybern.* 28:55–61, 1977), which is incorporated by reference.

Only the leak signal component, S(f) is of interest. However, it may be swamped by much greater noise, N(f). A Wiener filter which can optimally estimate S(f) may be defined in the frequency domain as $$H(f) = \frac{S(f)}{S(f) + N(f)/R}$$

This filter is a spectral weighting function, ranging in value from 0 to 1, which tracks the estimated power spectral density signal-to-noise ratio. A simple form of this filter was originally proposed in Reference Doyle (Doyle D J: A proposed methodology for evaluation of the Wiener filtering method of evoked potential estimation. *Electroencephalogr. Clin. Neurophysiol.* 43:749–751, 1977), which is incorporated by reference, for use in estimating averaged evoked responses in the human electroencephalogram. The optimally filtered frequency spectrum of the leak signal, $\hat{P}_x(f)$, is given by $$\hat{P}_x(f) = \overline{P}_x(f)H(f)$$

The optimally filtered frequency spectrum is a better estimate of the second order statistics of the received vibration signals. Its benefits include emphasizing the unique frequency components of any leak sounds present to aid in listening and correlation analysis, and attenuation of any noise due to artifacts, such as flow or environmental noise.

Once a characterization of the received data has been obtained, the representative signal may be modeled 350. The modeling may be carried out using a wavelet decomposition. The wavelet decomposition would usually be defined as the integral of the received data, x(t), multiplied by scaled, shifted versions of the Wavelet function γ(t):

$$C(a, k) = \int_{-\infty}^{\infty} x(t)\gamma(a, k, t)dt$$

The Wavelet Coefficients, C(a,k), are a function of scale (a) and position (k). The received data is decomposed by multiplying each coefficient by an appropriately scaled and shifted wavelet. Scaling a wavelet means stretching it in time using γ(t/a), varying a to sweep the desired frequency range. Shifting the wavelet, using γ(t-k), allows the desired time interval to be swept by varying k. The wavelet transform may be implemented efficiently in the monitor using, for example, the Mallat algorithm, described in Reference Strang (Strang G, Nguyen T. Wavelets and filter banks. Wellesley, Ma.: Wellesley-Cambridge Press, 1996), which is incorporated by reference. In practice, the decomposition of the optimally filtered representative spectrum, $\hat{P}_x(f)$, can be efficiently performed in the frequency domain. This procedure computes the wavelet coefficients, C(a,k), by applying a cosinusoidal octave filter bank to $\hat{P}_x(f)$ and integrating the filtered spectrum.

The benefits of the wavelet transform for characterizing any leak sounds present in the frequency spectrum are significant. Many types of leaks have a unique distribution of spectral energy. The wavelet coefficients provide an efficient and flexible means of modeling the distribution of energy of the leak sound in the frequency spectrum. By varying the wavelet scale (a) and position (k) it is possible to vary the characterization of the frequency spectrum of the received signal based on many factors, including, for example, the type and the size of pipe.

The parameters of the model, C(a,k), obtained from each recording may be saved in data memory 360. A history of such parameters may be expressed as a time series trend 370. Determination of a change in the condition of the pipe may be achieved by examination of the trend in this time series 380.

The trend may be examined by computing a linear predictive model of the parameters, as defined in Reference Gomis (Gomis P, Jones D L, Caminal P, Berbari E J, and Lander P, "Analysis of abnormal signals with the QRS complex of the high resolution electrocardiogram, *IEEE Trans. Biomed. Engr.* 40:231–239, 1997), which is incorporated by reference. A statistical test, such as the Fisher linear discrimination test described in Reference Van Trees (Van Trees HL. Detection; estimation and modulation theory. John Wiley & Sons, Inc., New York, N.Y., 1968), which is incorporated by reference, may be applied to determine whether there has been a significant change in the estimated leak signal component of the received vibration data.

Alternatively, the parameters of the model may be compared with a dictionary of model parameters, stored either in the monitor or at the base station. The dictionary may be organized by some ranking of the parameters, or it may be organized by pipe type, fluid, or some other means. A significant pattern match may be sought between the current model parameters and an item in the dictionary. Many methods of pattern matching are available, including statistics such as the minimum mean-squared error, and maximum likelihood, as described in Reference Van Trees, and non-linear methods such as Kahunen mapping, described in Reference Kohonen (Kohonen T. The Neural Phonetic Typewriter, pp. 11–22, in IEEE Computer 21, IEEE Computer Society Press, Washington, USA, 1988), which is incorporated by reference.

Monitor To Base Station Communication

Once the monitor has detected a significant change in the received data that is consistent with a leak, there are a number of programmed options for processing that information. One option is for the monitor to send a message to the base station immediately. This option is useful when there is an urgent need to respond to a pipe failure quickly, such as might occur in a high-pressure gas main. Alternatively, the monitor may send messages to a base station regularly, such as, for example, once a month. This option would be useful when leaks are frequent and the detected abnormality does not indicate a catastrophic failure. This option has the benefit of conserving power in the monitor and, hence, operating battery life. In this mode, the monitor may also update the base station with information on the deterioration of any leak conditions, thus allowing scheduling of pipeline repair and maintenance tasks.

Data Analysis

The monitors may be replaced in the docking station after recording from the pipeline network for any particular period of time. The base station can cause the docking station to read the timers from two or more monitors simultaneously, thus measuring the temporal drifts among timers in different monitors. The docking station can download vibration data from the monitors to either itself or a base station. The vibration data from the monitors can then be time-aligned using the measured temporal drifts, the known time of initial synchronization, and the known programmed time of recording. The detection and pinpointing of any leaks can then be determined using, for example, the method of cross-correlation described in Lander, U.S. Pat. No. 5,974,862, which is incorporated by reference.

While in the docking station, the monitors may be initialized and then deployed on the pipeline network to make new recordings. Alternatively, the monitors may be re-deployed on the pipeline network and resume monitoring with their previous history of recordings intact.

In another implementation, a docking station is not used to time-align or to download vibration data from different monitors to a base station. A base station which is either in proximity to, or remotely stationed from, the monitors may broadcast a message to two or more monitors. Provided the delay in receipt of this transmission at two or more monitors can be arranged to be approximately equal, the message can be used to synchronize two or more monitors. In one approach, monitors are instructed to read a synchronous timing source, such as a transmission from a Global Positioning Satellite (GPS). Each monitor will read the time value using a GPS receiver and can then compute the exact time offset between the GPS timing source and its own-timer. A base station may then use this information to compute the precise temporal drifts from different monitors and subsequently time-align vibration data downloaded from different monitors. In a second, alternative approach, a portable base station with an integral timing source is brought into proximity with the monitor and transmits a synchronization signal.

Figure 9:
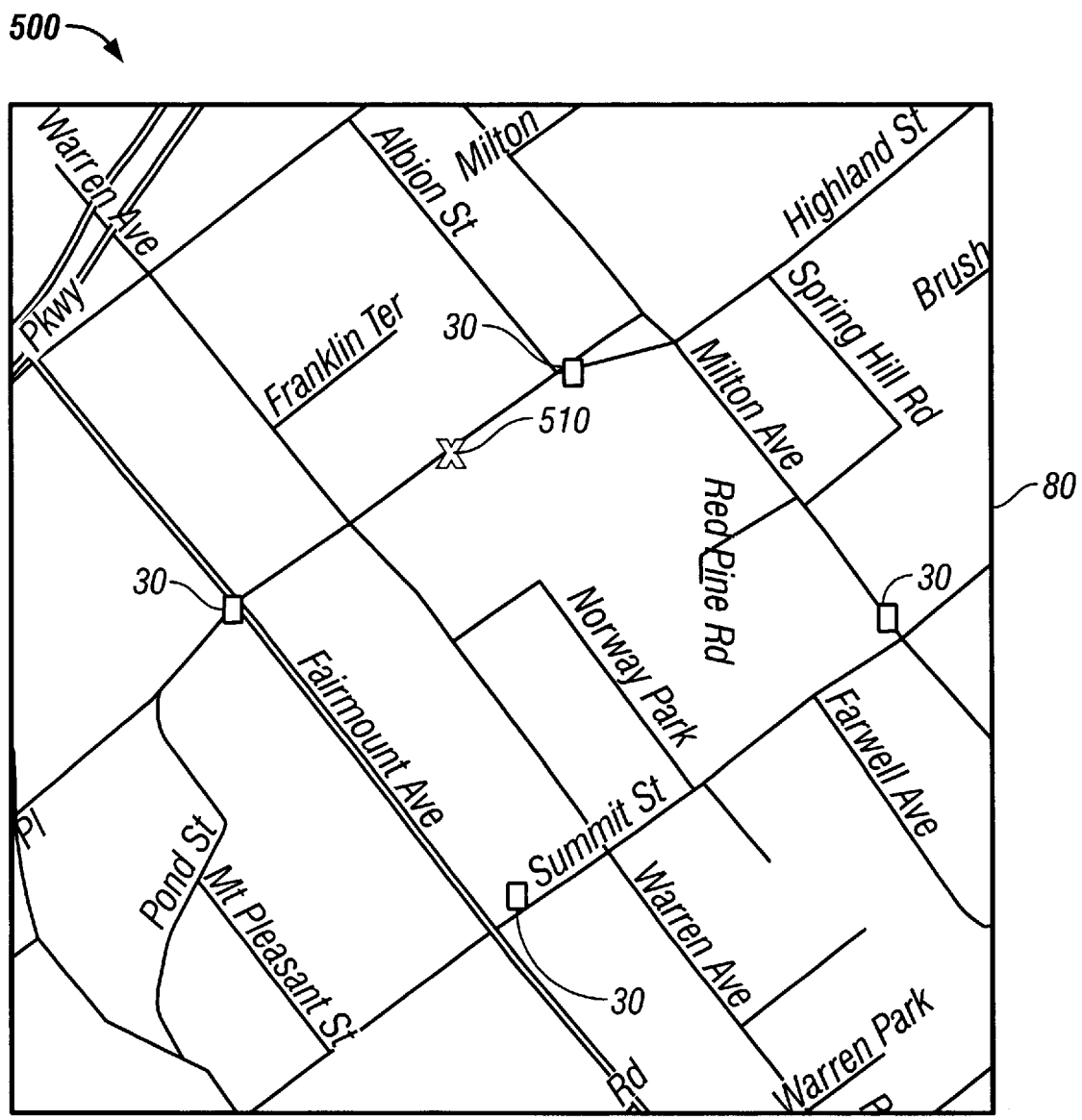
FIG. 9 is a diagram of an example of a cartographic display including a map of the pipeline network, with the locations of monitors and detected leaks marked.
Figure 10:
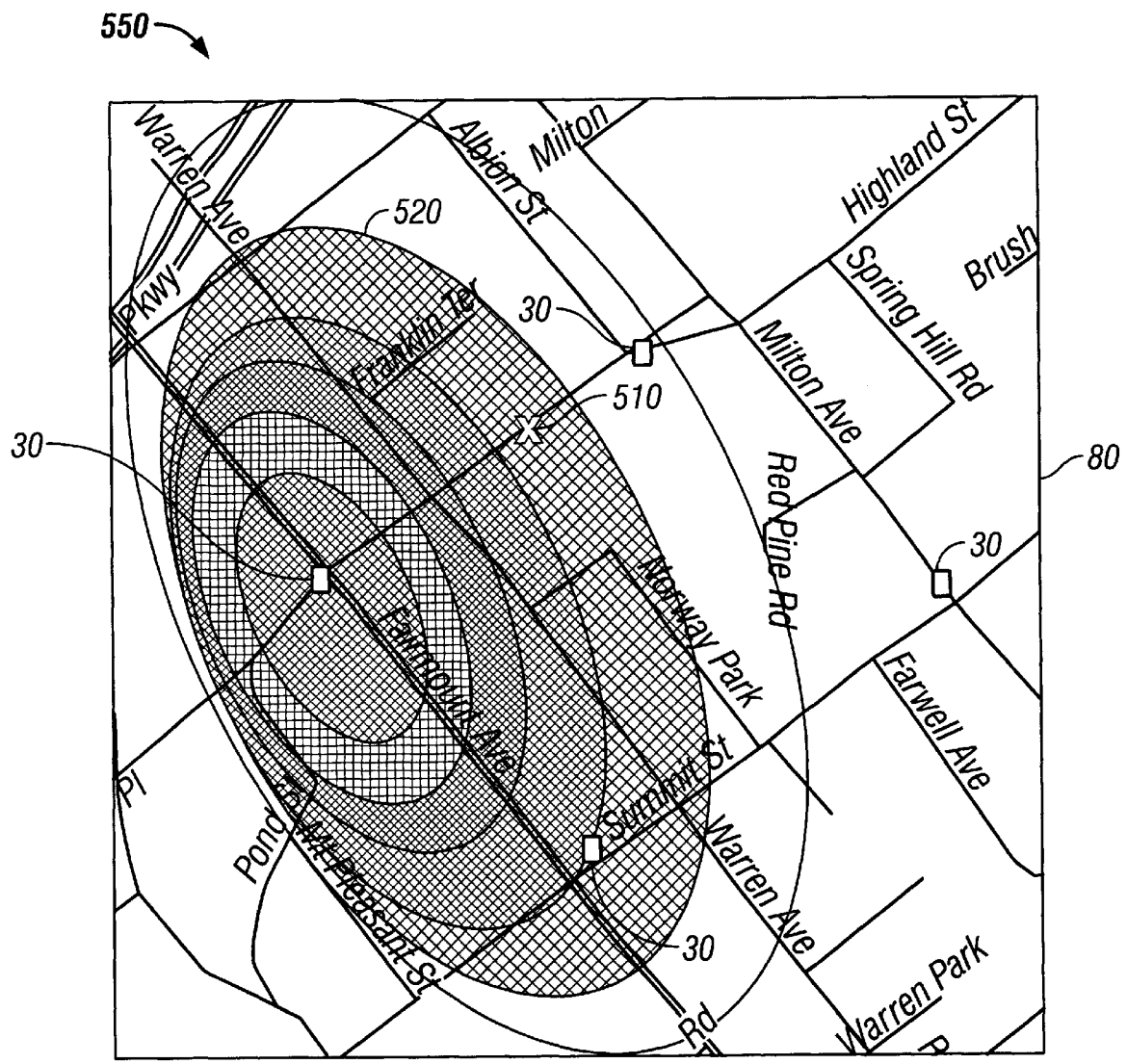
FIG. 10 is a diagram of an example of a spatial display representing the spatial distribution of a parameter of vibration data recorded from different monitors.

Several means of graphically displaying vibration data from one or more monitors can assist in analysis of vibration data from the Pipeline network. Referring to FIG. 9, the location of monitors 30 and of any pinpointed leaks 510 may be shown on a map 80 of the pipeline network. This type of cartographic or spatial display 500 may be further enhanced by graphically representing parameters of the vibration data recorded from one or more monitors. Referring to FIG. 10, the display may include, for example, the average vibration energy recorded recently and represented using a solid color map 520. Other parameters may also be displayed in this manner, including, for example, a representation in which the solid color map represents spatially filtered parameters or the difference in parameters at two different times. The display of FIG. 10 may be further enhanced to include multiple cartographic or spatial plots, plotted in relation to each other, and representing the state of parameters recorded at a number of different times. These types of displays aid greatly in summarizing information about the monitors and the recorded vibration data.

Figure 11:
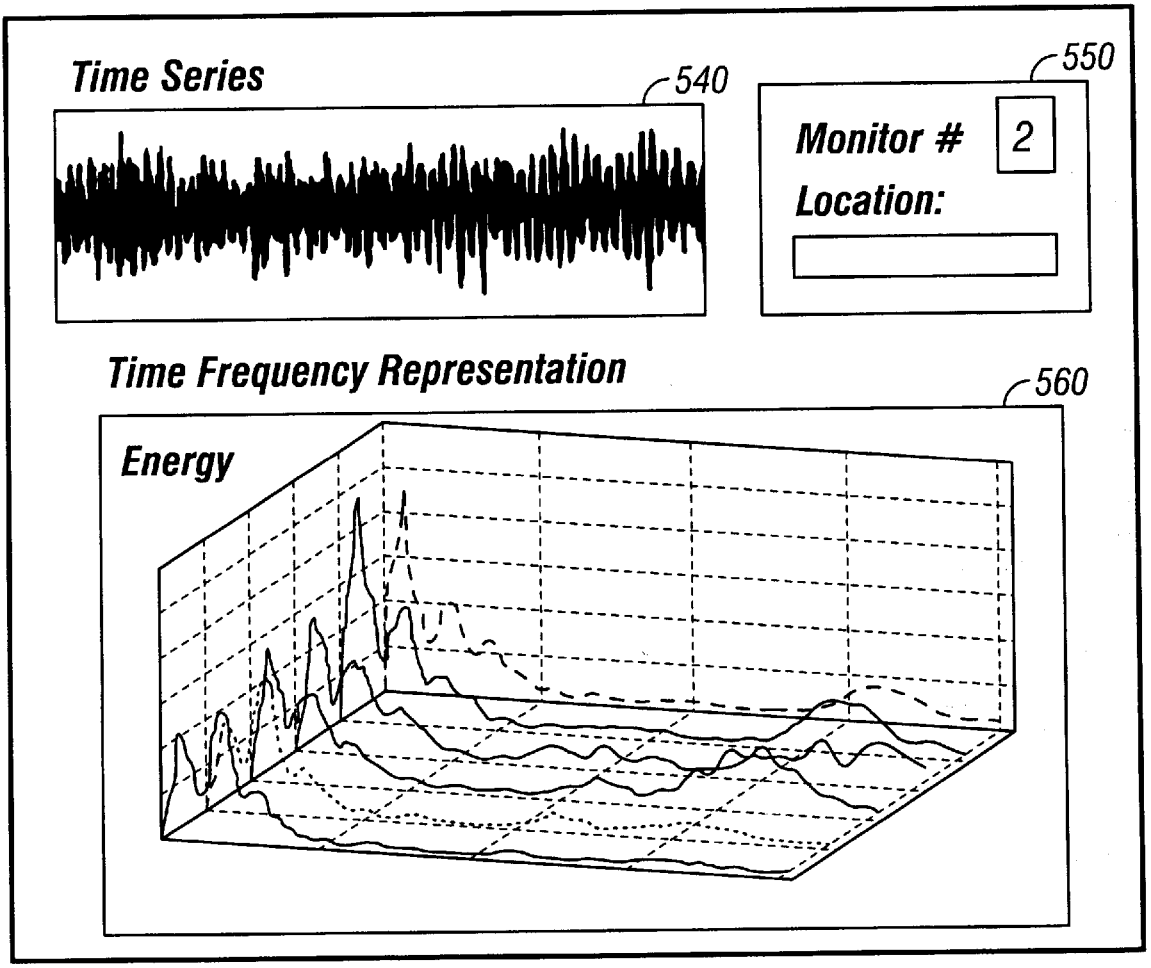
FIG. 11 is a diagram of an example of both a time series and a time-frequency representation of a parameter computed from vibration data recorded at different times.

Referring to FIG. 11, another type of graphical display has a time series 540 of one parameter measured at a progression of times in one monitor. The time series plot may be further enhanced by including two or more parameters, or by including parameters recorded from more than one monitor. The display may include information 550 about the vibration data being displayed, such as the number and location of the recording monitor. Another useful type of display is a time-frequency representation 560, where the energy of the vibration data is displayed simultaneously as a function of time and frequency. Abnormal vibrations from a pipeline have a particular signature in the time-frequency domain, exhibiting a varying spectral shape over time. Thus, this type of display can aid in leak identification in cases where a frequency spectrum alone would not be sufficient to identify the leak.

Leak Detection Systems

In one particular configuration, a leak detection system including two or more monitors is deployed for a short period of time, for example, overnight. Monitors are placed in a docking station. The base station initializes each monitor, including time-synchronizing the timers of each monitor. Monitors enter sleep mode, are deployed on the pipeline network, and are activated by their processors to receive vibration signals three times during the night for thirty seconds each time, starting, for example, at 2:30 a.m. The received vibration signals are stored digitally in the monitors' memory units. Monitors are retrieved the next day and returned to their docking station. The base station downloads the received vibration signals from each monitor and measures the differences in timer state among monitors placed in the docking station. The measured time differences permit the base station computer to compensate for any misalignment in time that may be present in the processed signals received at programmed times by the different monitors. Once time-aligned, the processed signals may be analyzed to obtain measures of the time delay between coherent vibration signals received by the monitors, whereby any leaks present in the pipeline network may be localized. This leak detection system is portable, low-cost, can include any number of monitors, and may be deployed rapidly and flexibly at different locations every night.

In another configuration, monitors are similarly deployed after being initialized, including time-synchronization of the timers in each monitor. In this alternative configuration, monitors are deployed for a moderate period of time, for example between seven and ninety days. Monitors remain in sleep mode except for the intervals during which they have been programmed to receive vibration signals, for example, for sixty seconds each night at 3:00 a.m. Received vibration signals are processed to produce a model of a representative vibration signal. Data comprising the series of models produced at each programmed interval are saved in the memory unit of each monitor. The received vibration data may also be saved at any time during the period of deployment. When the monitors are returned to their docking station, all processed data is downloaded to the base station.

Errors in time-alignment of the received vibration signals are corrected for at this time by the base station.

Trends in the modeled data may now be examined to detect and monitor any abnormal vibration signals present in the pipeline. This data-adaptive, historical view of the received vibration signals is useful to detect smaller, emerging leaks that may be missed by other methods. Different leaks present in the same span of the pipe—including pre-existing leaks—may be separately detected and characterized by this form of analysis. Examples of characterization include estimation of the age, size, and type of the leak, its likely cause (joint, crack, pinhole etc.), and estimates of the leak flow rate and likely time before catastrophic failure of the pipe. In addition to the analysis of modeled data trends, processed signals representing the vibration signals received at particular times may also be analyzed. For example, cross-correlation techniques may be used to localize the position of any leaks present.

This leak detection system could comprise a larger number of monitors than a system deployed for a shorter period of time. It provides more information that can only be obtained by analyzing vibration signals over a period of time. Applications include but are not limited to surveying of zones prior to cold winter weather or hot summer weather which might cause pipe failures at susceptible locations. Zones with many connections to the network, such as downtown areas, will benefit from a form of analysis capable of distinguishing different types of leaks and monitoring their development over time. This leak detection system is capable of providing a comprehensive analysis of a significant area of a pipeline network. However, its data-adaptive, locally-intelligent character means that the system retains the flexibility to be re-deployed at any time, as needed.

In a third configuration, monitors may be deployed for a long period of time after initialization. Received vibration signals are processed at programmed times and saved in the memory unit of each monitor. Monitors are in two-way digital communication with a base station directly from their site of deployment on the pipeline network. The base station may change the programming of one or more monitors under user control and may download processed data through the monitor's digital communication means. Examples of the digital communication means include but are not limited to transceiving data on a digital wireless network, telephone or cable communication, and short-range range wireless transmission to an intermediate data collection point, such as mobile transceiver in a vehicle. The user may interact with the monitors directly through a wireless network or through a computer network such as the internet.

In this leak detection system, monitors act as data-adaptive, locally-intelligent processors with flexible communication with a base station. There are numerous benefits to this system that are readily apparent. The system can provide continuous network-wide surveillance. Monitors may be reprogrammed, re-synchronized, or re-deployed at any time. Monitors may issue alarms at any time when indications of any leaks are detected. The threshold for alarms can be adapted to the monitor's location and the relative importance of detecting a break in the pipe. Pre-existing, newly emerged, stable, or catastrophic leaks may all be detected. The base may notify any number of monitors of changing pipe conditions in their environment, for example, the repair of a discovered leak. The monitors may then reset their analysis parameters of vibration signals and resume monitoring.

Other embodiments are within the scope of the following claims.

What is claimed is:

1. A method for monitoring vibrations in a pipeline network, the method comprising:
   providing a set of two or more monitors, each monitor comprising a sensor, a timer, a processor, a memory unit, and a digital communication device;
   initializing the monitors;
   applying the sensors of the monitors to a pipeline network, the sensors detecting vibrations in the pipeline network and producing corresponding vibration signals;
   receiving vibration signals from the sensors at one or more programmed times under the control of processors of the monitors;
   digitally processing the received vibration signals with processors of the monitors and saving the processed data in the memory unit of the monitor;
   digitally communicating the processed signals between the monitors and a base station using the digital communication devices;
   measuring temporal drift between timers of the monitors; and
   analyzing the processed signals using the measured temporal drift to obtain measures of any leaks present in the pipeline network.

2. The method of claim 1 wherein initializing the monitors includes synchronizing the timers of two or more monitors.

3. The method of claim 1 wherein applying a sensor includes applying a sensor using an electromagnetic tool, whereby the monitor can be maneuvered onto a pipeline fitting in an enclosed space.

4. The method of claim 1 wherein the processing step includes digitally compressing a received signal to produce compressed data, whereby the compressed data retains the approximate sound characteristics of the uncompressed data with a reduced digital storage requirement.

5. The method of claim 1 wherein the processing step includes determining a representative vibration signal from one or more vibration recordings to obtain a more accurate representation of the typical vibration present at the sensing location.

6. The method of claim 1 wherein the processing step includes computing a mathematical model of a received vibration at any particular time.

7. The method of claim 1 wherein the processing step includes computing a Wiener filter from received vibration signals and using the Wiener filter in processing the received vibration signals.

8. The method of claim 1 wherein the processing step includes computing parameters of the model, whereby said parameters allow a comparison of models computed at different times.

9. The method of claim 1 wherein the processing step includes computing parameters of the model using a wavelet transform.

10. The method of claim 1 wherein the processing step includes computing a trend of the model parameters from a series of two or more received signals recorded at different times.

11. The method of claim 1 wherein the processing step includes determination of a change in the trend of the model parameters.

12. The method of claim 1 wherein the processing step includes comparison of a model with models contained in a pre-programmed dictionary of models, whereby an abnormal vibration in the pipeline network can be identified.

13. The method of claim 1 wherein the communicating step includes receiving a command by the monitoring unit which has been sent from the base station.

14. The method of claim 1 wherein the analyzing step includes re-synchronizing two or more monitoring units, whereby the received vibration signals from two or more monitoring units may be time-aligned.

15. The method of claim 1 wherein the analyzing step includes computing a cross-correlation function using two or more received signals from two or more monitoring units, whereby coherent sounds may be detected and their sources localized.

16. The method of claim 1 wherein the analyzing step includes display in the form of a time series of received vibration signals recorded at different times.

17. The method of claim 1 wherein the analyzing step includes display in the form of a time-frequency representation of received vibration signals.

18. The method of claim 1 wherein the analyzing step includes display in a spatial representation of received vibration data from two or more monitors, using approximate geographical locations of said monitors.

* * * * *